United States Patent
Frenken

(10) Patent No.: US 9,255,601 B2
(45) Date of Patent: Feb. 9, 2016

(54) NUT AND COMBINATION OF A BOLT PART WITH A NUT

(75) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 230 days.

(21) Appl. No.: 13/809,672

(22) PCT Filed: Jul. 7, 2011

(86) PCT No.: PCT/EP2011/061475
§ 371 (c)(1),
(2), (4) Date: Feb. 13, 2013

(87) PCT Pub. No.: WO2012/019832
PCT Pub. Date: Feb. 16, 2012

(65) Prior Publication Data
US 2013/0202381 A1 Aug. 8, 2013

(30) Foreign Application Priority Data
Jul. 19, 2010 (DE) .......................... 10 2010 036 482

(51) Int. Cl.
*F16B 39/28* (2006.01)
*F16B 37/08* (2006.01)

(52) U.S. Cl.
CPC ................. *F16B 39/28* (2013.01); *F16B 37/08* (2013.01); *F16B 37/085* (2013.01)

(58) Field of Classification Search
CPC ............................... F16B 37/085; F16B 39/28
USPC ......................................... 411/267, 432–434

IPC .............................. F16B 37/0807,37/08, 37/041
See application file for complete search history.

(56) References Cited

U.S. PATENT DOCUMENTS 1,172,669 A * 2/1916 Caldwell ........................ 411/432
1,451,970 A * 4/1923 Taylor ........................... 411/418
(Continued)

FOREIGN PATENT DOCUMENTS

| EP | 0273863 | 6/1988 |
|----|---------|--------|
| GB | 692041 | 5/1953 |
| GB | 2140888 | 12/1984 |

OTHER PUBLICATIONS

International Search Report, PCT/EP2011/061475, Feb. 2, 2012.

*Primary Examiner* — Gary Estremsky
(74) *Attorney, Agent, or Firm* — Klintworth & Rozenblat IP LLC

(57) ABSTRACT

The invention relates in first instance to a nut having a first part (11) which has a first through opening ($O_1$), and having a second part (12) which has a opening ($O_2$) having an opening contour, the parts (11, 12) being connected so as to be rotatable about a rotational axis (A) which passes through the openings ($O_1$, $O_2$), and the openings ($O_1$, $O_2$) being aligned with one another, in addition, the first opening ($O_1$) on its inner face having a profile which extends in the peripheral direction and which is interrupted in the peripheral direction. In order to provide a nut which is quickly mountable on a threaded bolt, and which has a simple design that allows greater security against the nut coming off the threaded bolt, it is proposed that the opening contour of the second opening is non-circular. The invention further relates to a combination of a bolt (4) having a cross-sectional area with a nut (10).

17 Claims, 15 Drawing Sheets

(56) References Cited

U.S. PATENT DOCUMENTS

| | | | |
|---|---|---|---|
| 2,442,064 A * | 5/1948 | Veit | 411/349 |
| 2,517,364 A * | 8/1950 | Torresen | 411/432 |
| 2,736,227 A * | 2/1956 | Stroble | 411/433 |
| 2,742,073 A * | 4/1956 | Iannetti | 411/232 |
| 2,807,854 A * | 10/1957 | Mellen et al. | 411/554 |
| 4,781,507 A * | 11/1988 | Duenas | 411/433 |
| 4,968,201 A * | 11/1990 | Frizot | 411/14.5 |
| 6,045,188 A * | 4/2000 | Schooler | 297/362.14 |
| 7,270,509 B2 * | 9/2007 | Disantis et al. | 411/332 |

* cited by examiner

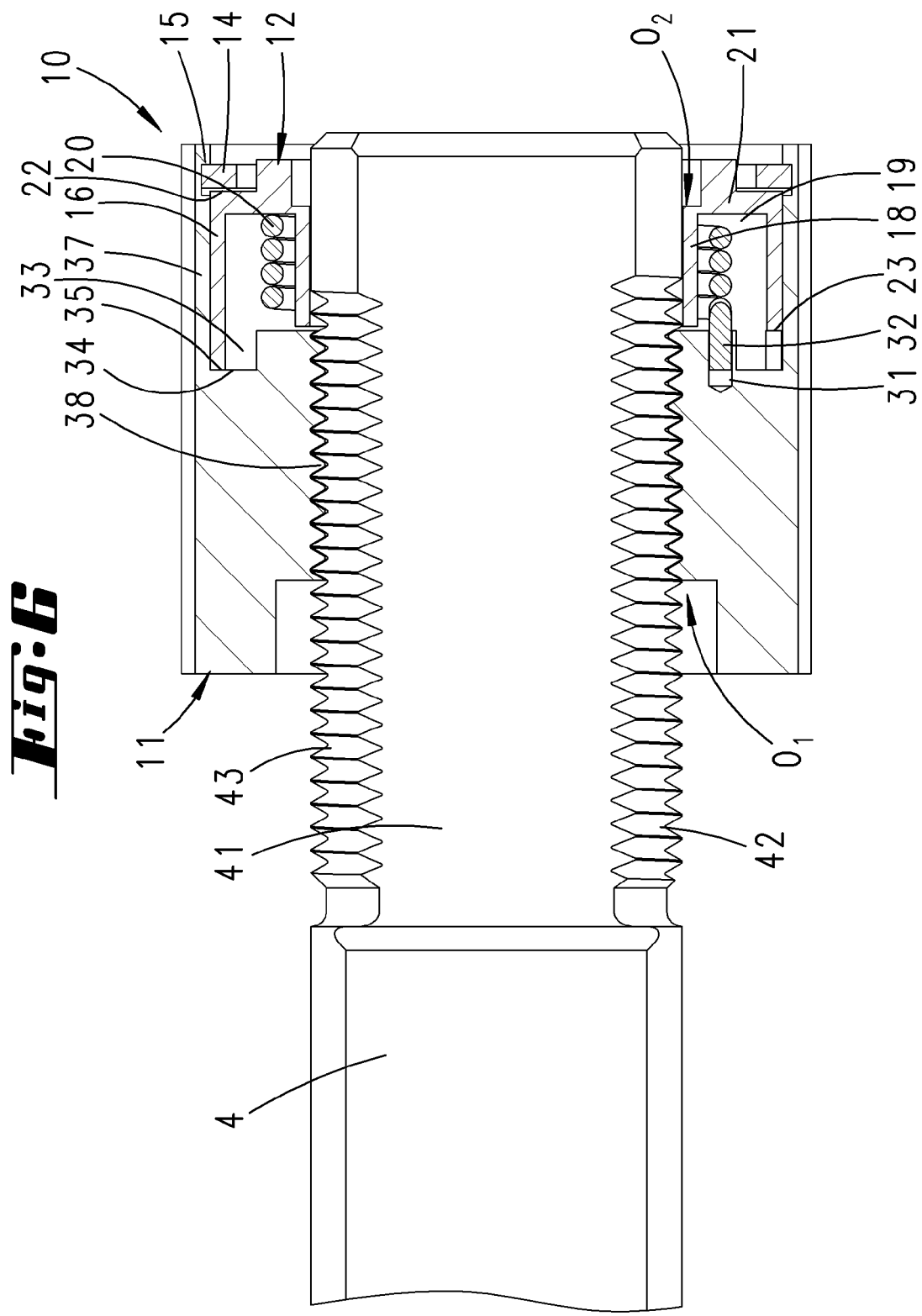

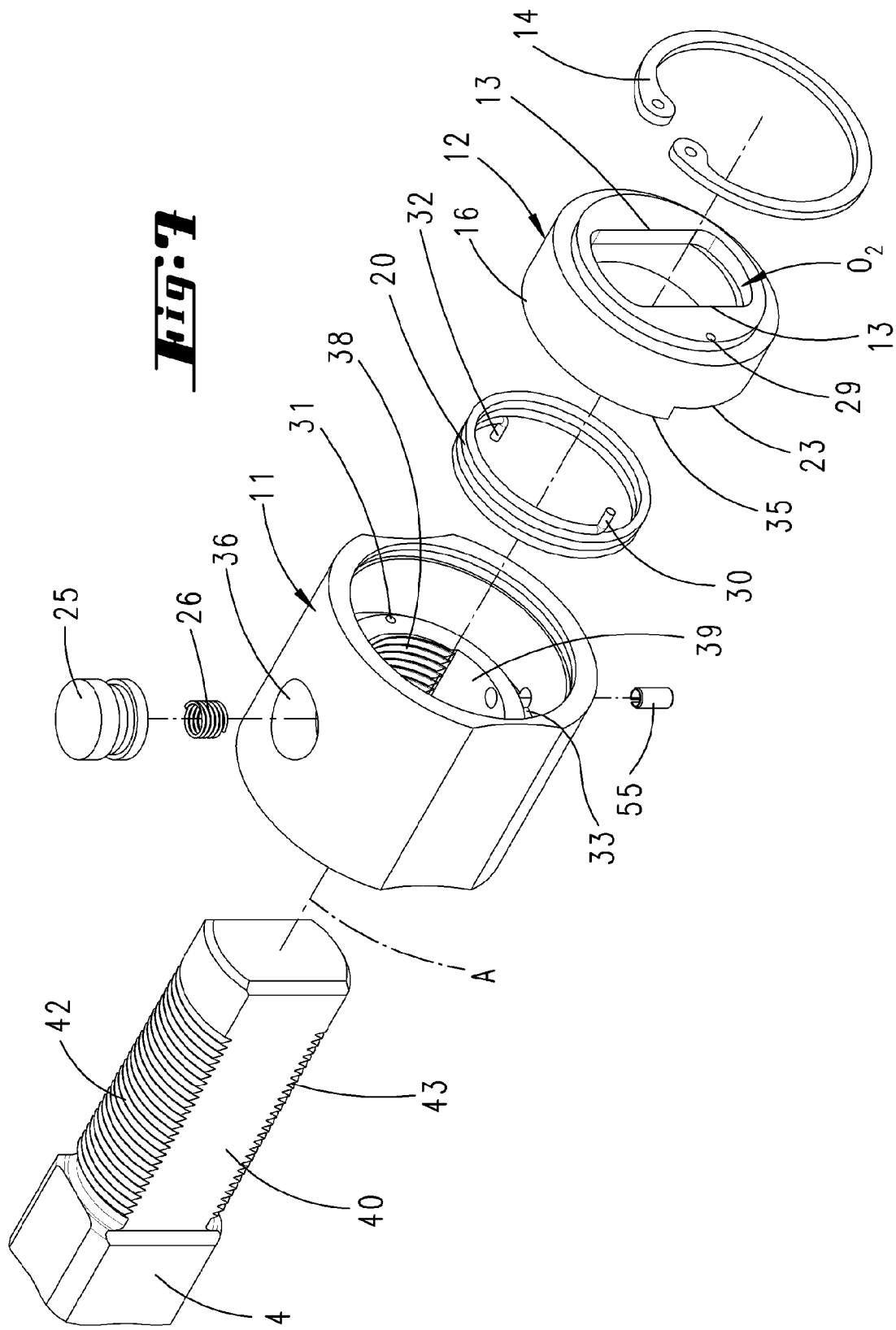

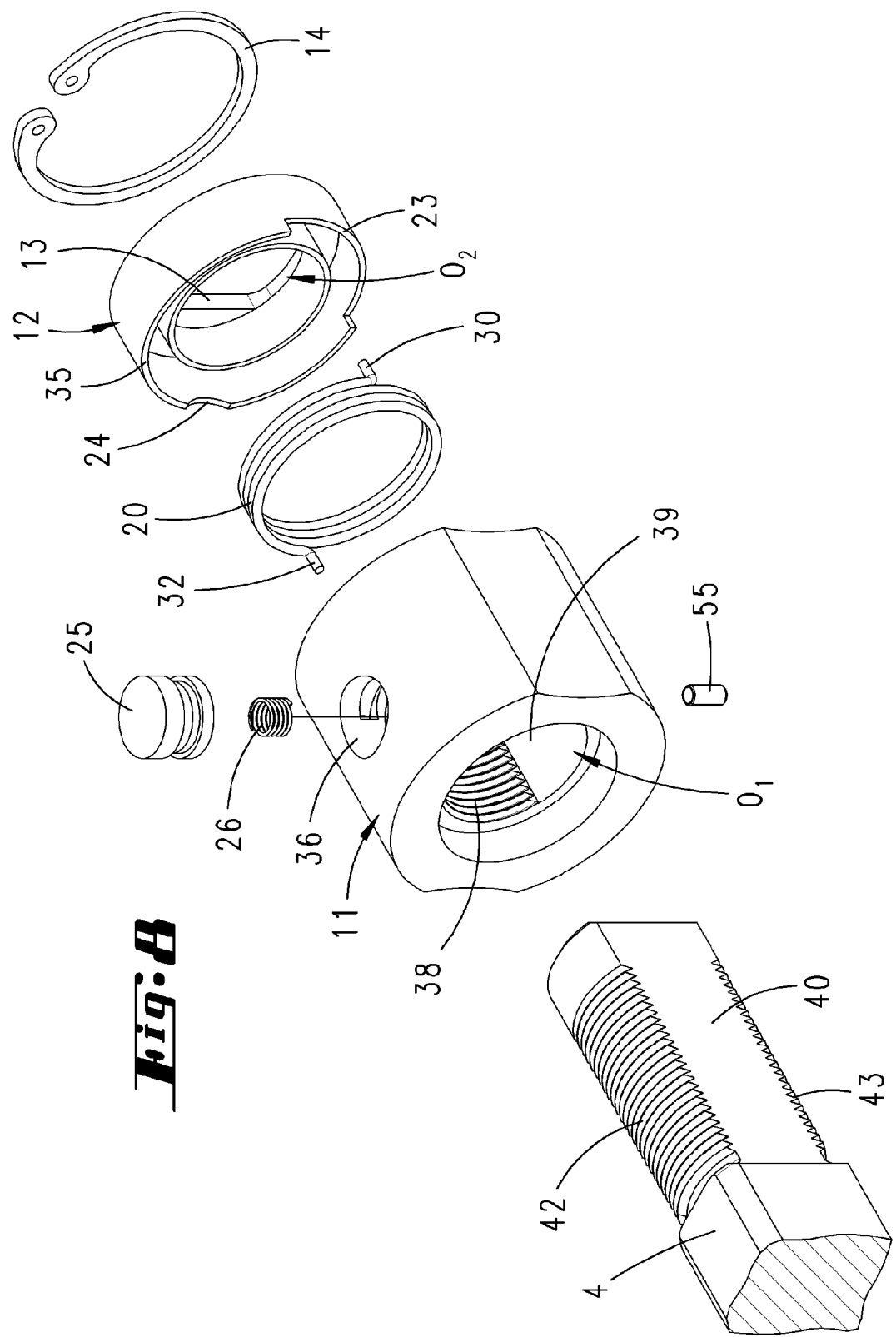

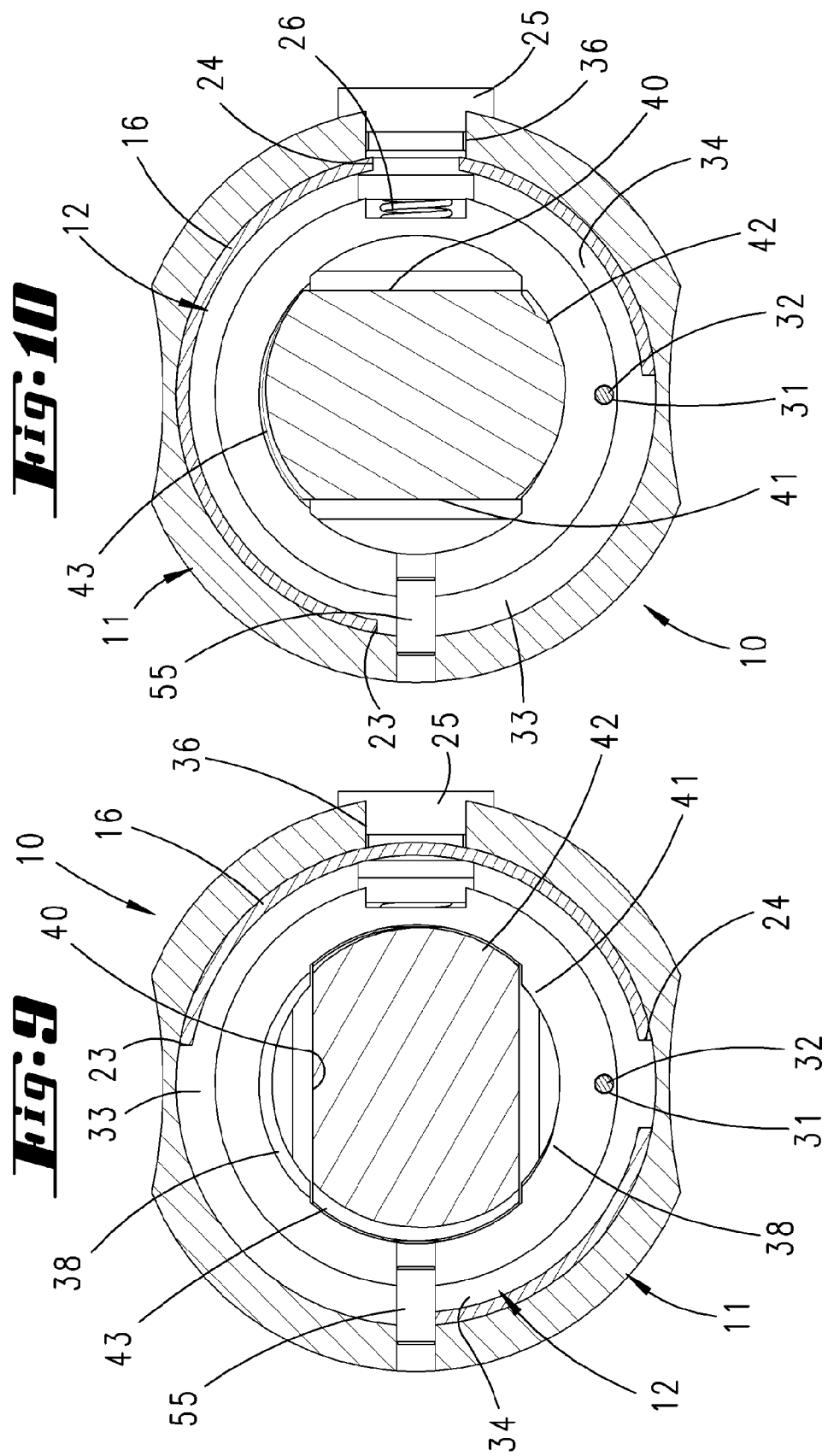

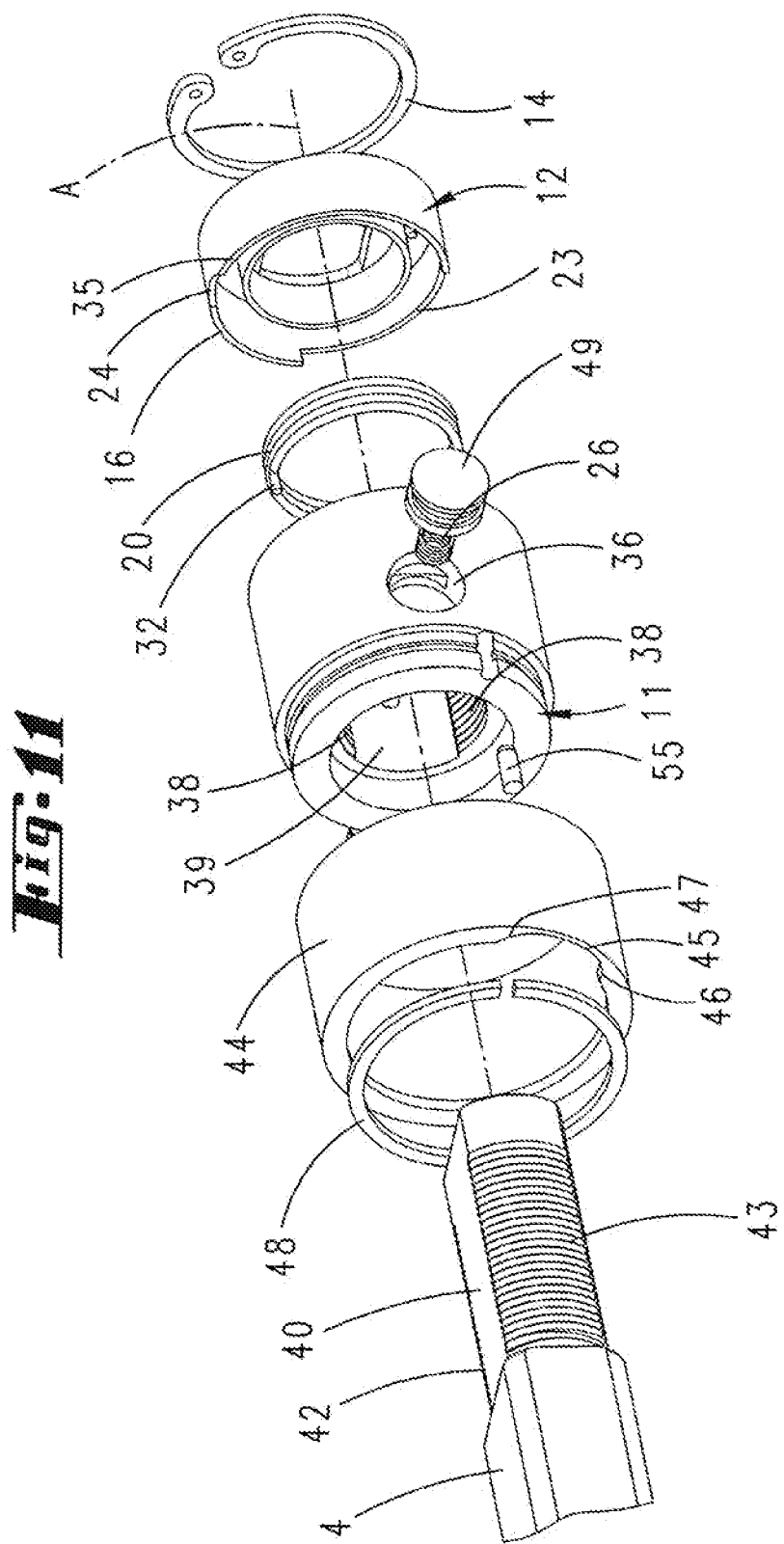

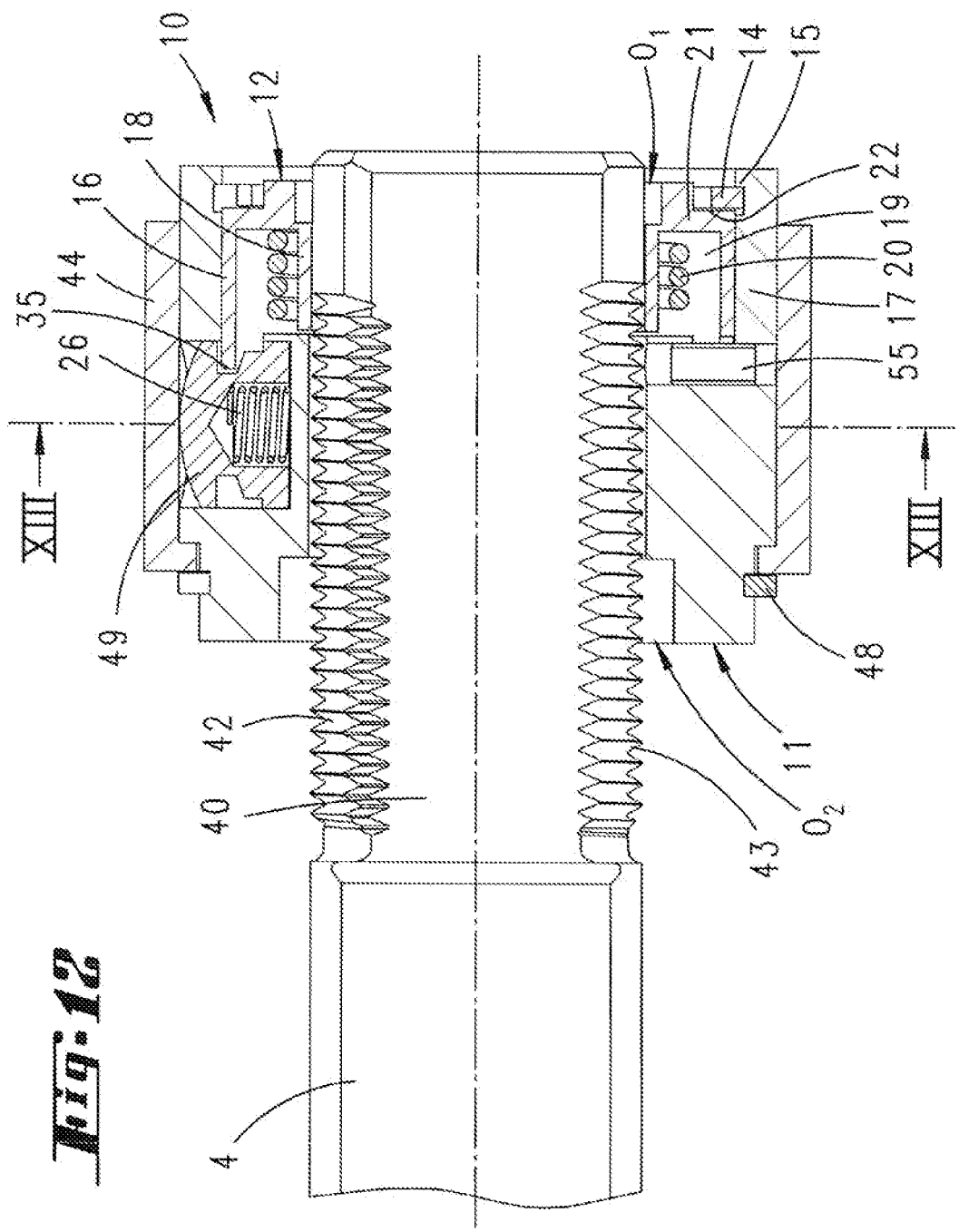

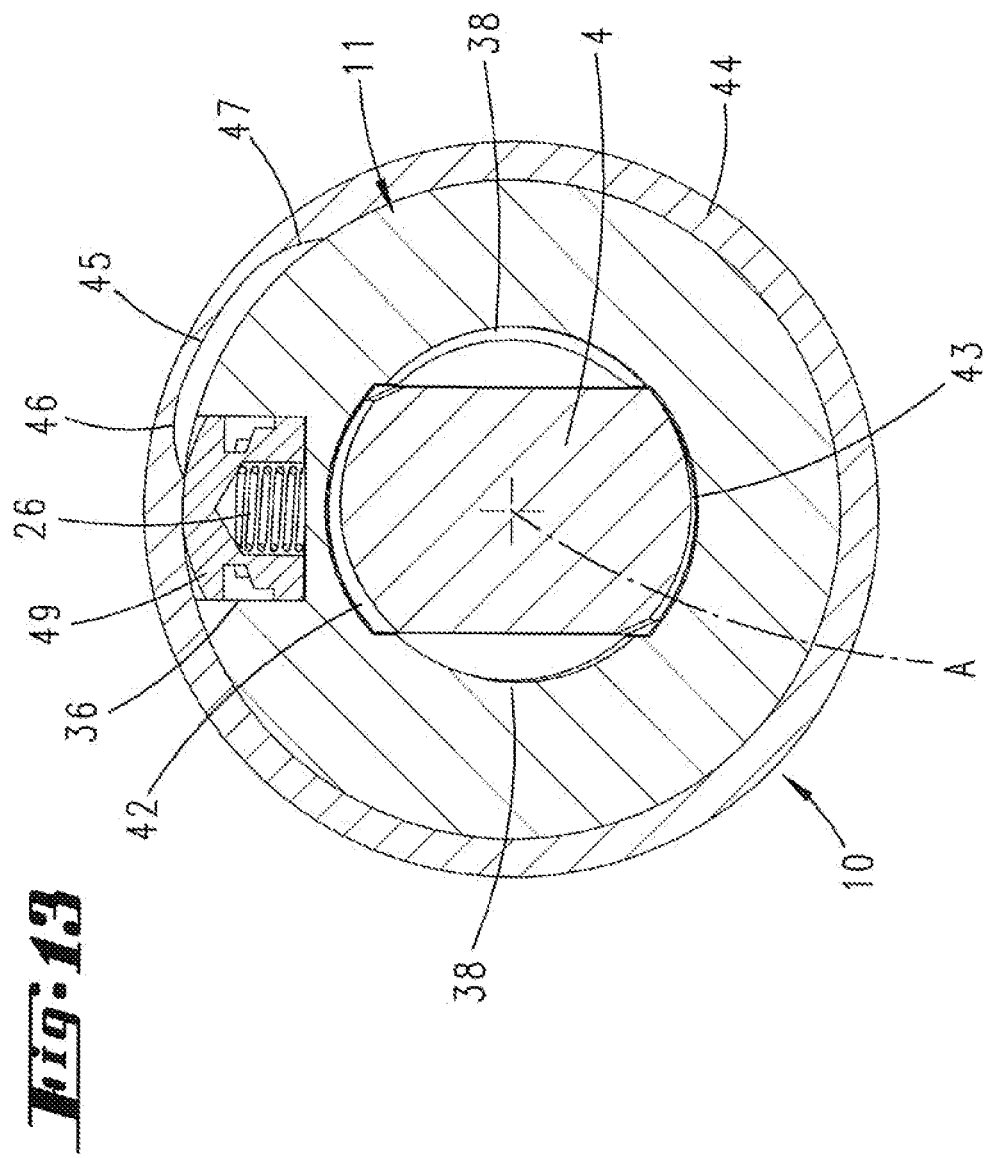

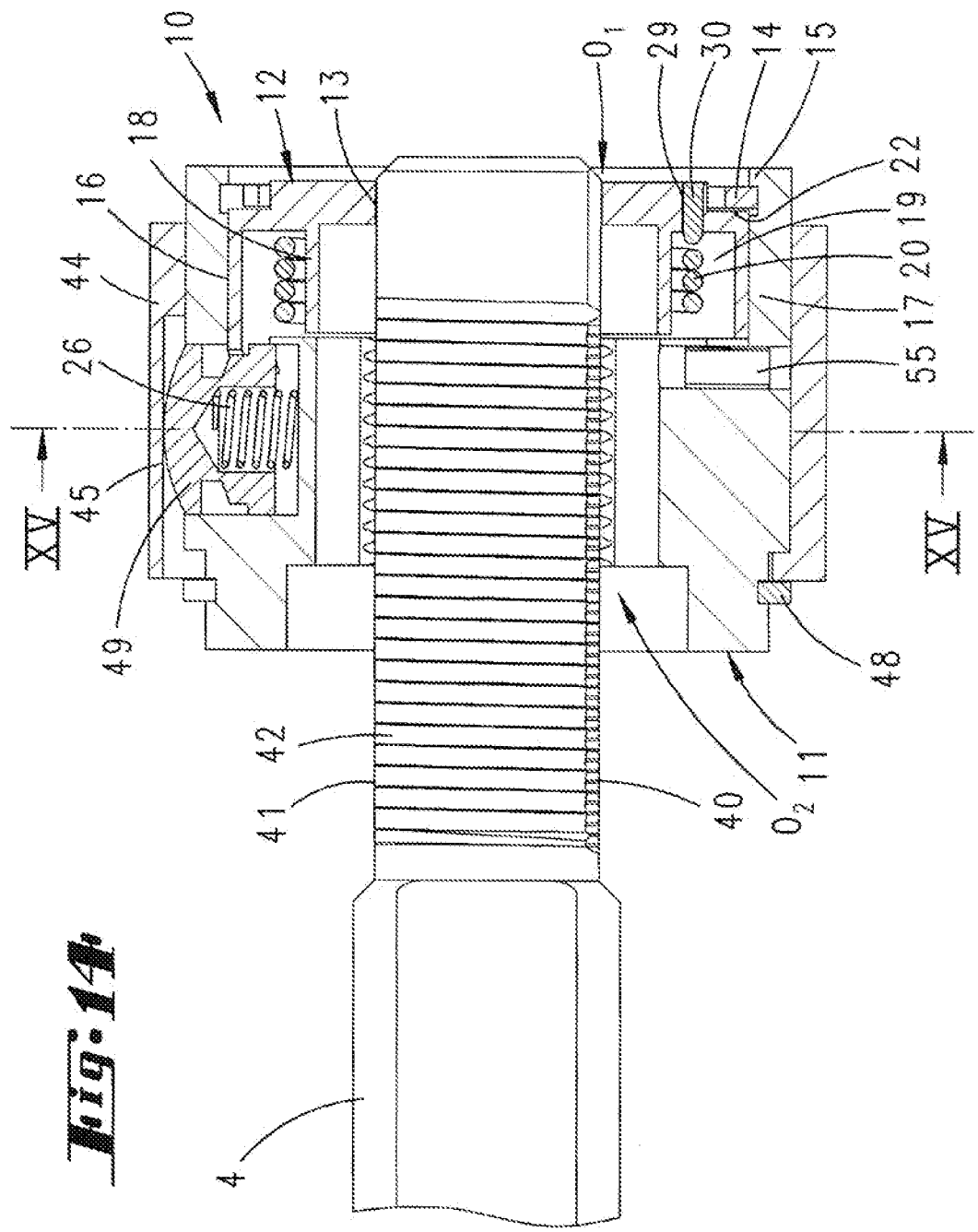

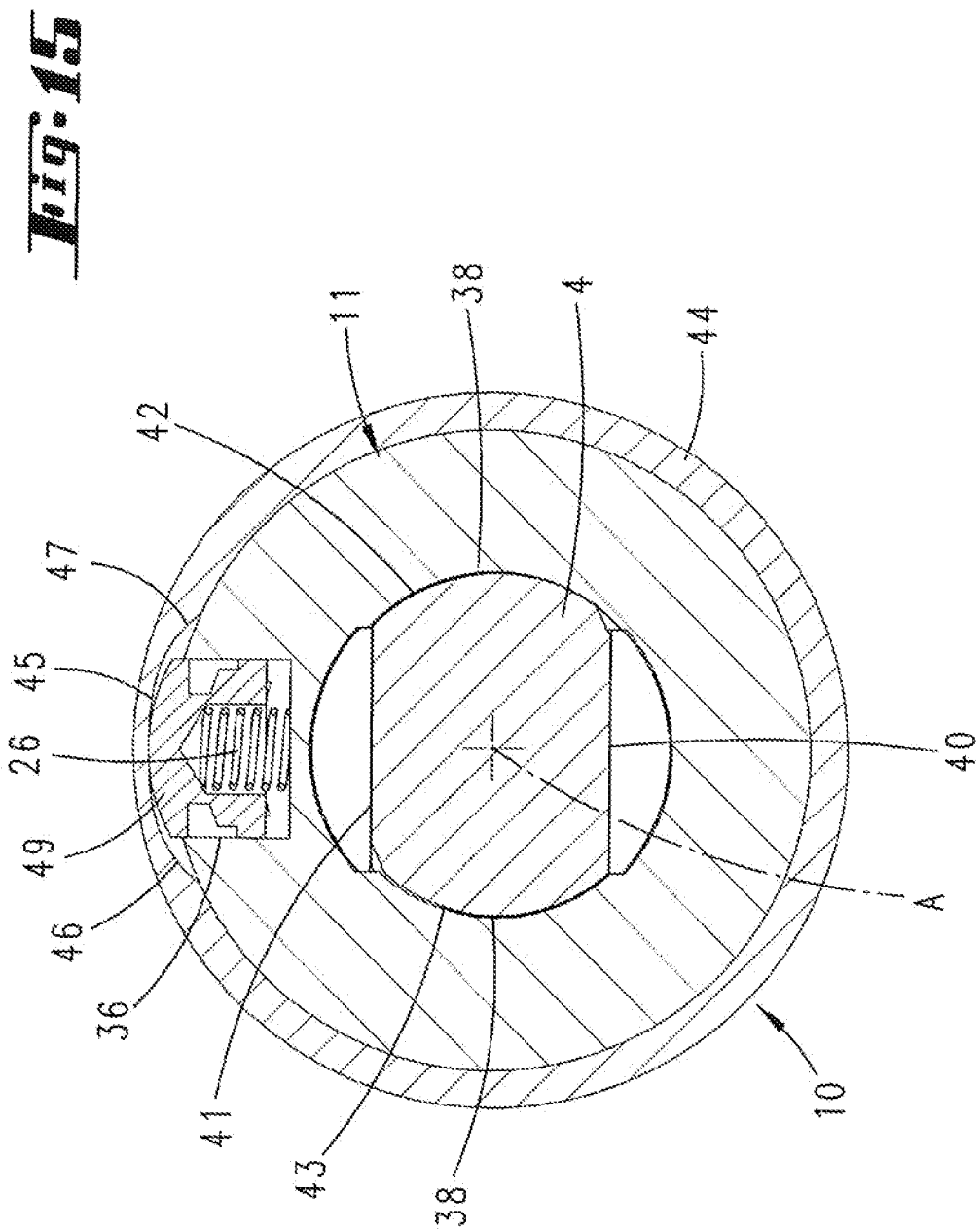

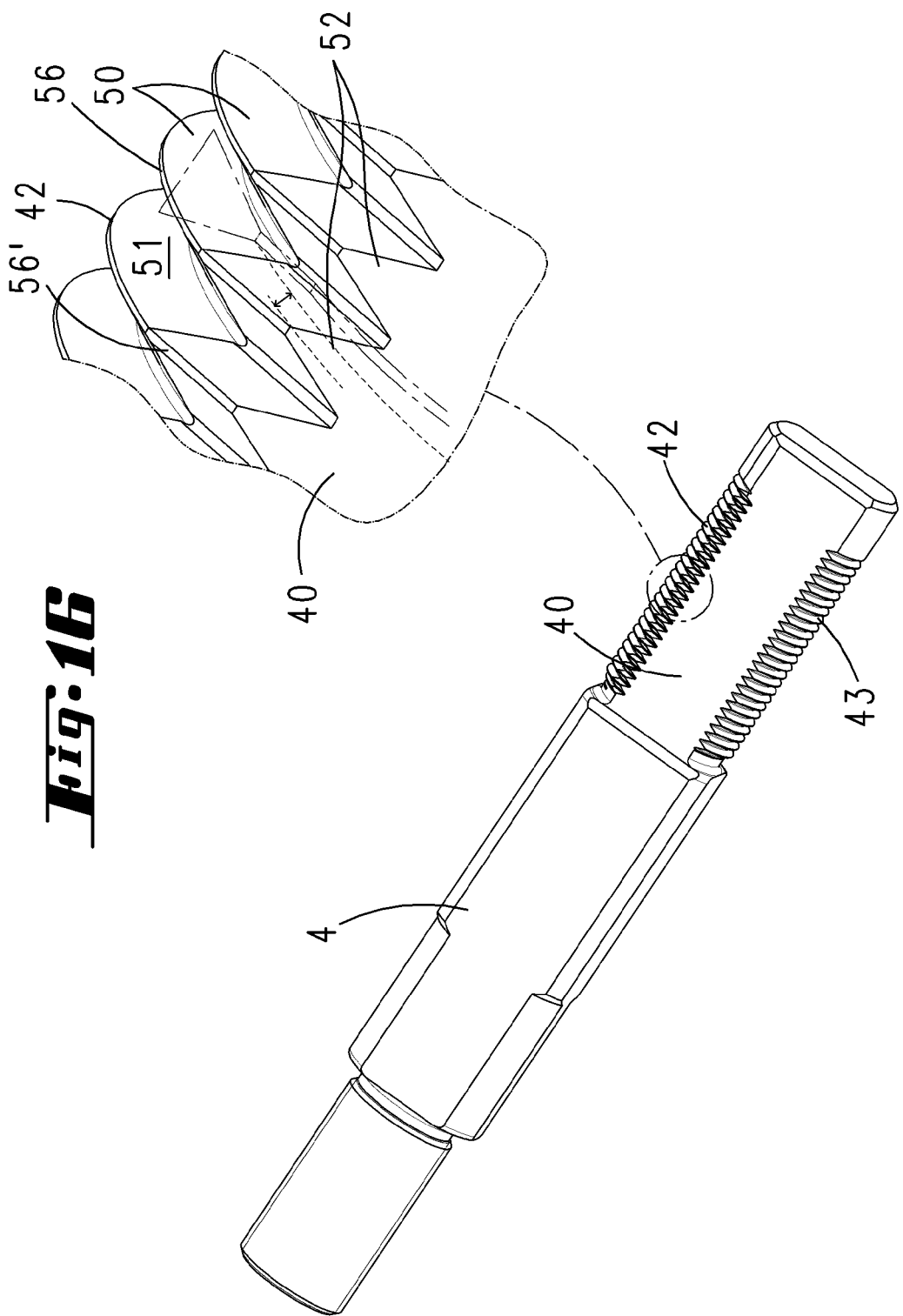

NUT AND COMBINATION OF A BOLT PART WITH A NUT

FIELD OF THE INVENTION

The invention relates to a nut and a combination of a bolt with a nut.

BACKGROUND OF THE INVENTION

A nut of this kind is known from U.S. 2009/0226281 A1, for example. In the known nut, threaded partial segments which extend over a portion of the circumference are accommodated in the first part, the threaded partial segments being movable, in particular vertically movable, relative to the first part. A second part forms a counterstop for a compression spring which acts on the threaded partial segments. The known nut may be mounted on a threaded bolt, the receding threaded partial segments allowing the nut to slide over the thread. When the nut is then rotated, the threaded partial segments engage in the thread of the bolt, and the nut may be tightened. A washer which is also provided and is connected to the first part in a rotatable manner and also connected to a spring chamber that is fixed to the nut in a positive-fit manner, creates continuous preloading of the nut in the locking direction due to biasing of the spring when the nut is tightened and the washer rests on an item to be loaded, so that loosening is counteracted.

Nuts of this kind and combinations of nuts with bolt parts are in addition known from U.S. Pat. No. 4,781,507 B1 and GB 692041 B. In the case of the item from the US specification mentioned, two nut parts are provided that have thread turns and are freely rotatable relative to one another. Furthermore, an insertion part having no profile is provided which is rotatable relative to the threaded parts mentioned. It is possible for the rotatability of the part formed without profiling relative to a threaded part to be unlimited. The twisted position can only be secured between the parts that have the thread formations.

The bolt to be introduced into the nut is provided with a thread formation right up to its free end.

A nut is known from the British specification mentioned in which a part can be inserted that can be decent-locked on this nut in rotationally delimited manner and has an opening which is formed without a profile and through which a bolt can be inserted. In addition, a threaded part which furthermore also has an external thread can be screwed into the nut. For release, the parts can only be unscrewed together.

Nut securing systems are also known in other configurations. Reference is made to DE 197 01 317 B4, EP 2 128 461 A1, DE 198 25 132 A1, and FR 2 762 367 A1, for example.

SUMMARY OF THE INVENTION

Starting from the above-mentioned state of the art, it is an object of the invention to provide a nut which is quickly mountable on a threaded bolt, and which has a simple design that allows greater security against the nut corning off the threaded bolt. At the same time, a combination of a bolt part and a nut is to be provided, which can be securely connected to one another.

The object mentioned is initially met by the subject matter of claim 1, in which it is specified that the second part is rotatable relative to the first part about the axis of rotation in a limited angular range, the parts are secured to one another in the twisted position in a positive-fit manner, and action takes place on a part that secures the twisting in order to discontinue the twisted position. As regards the combination mentioned, the object is met by the subject matter of claim 8, in which it is specified that the bolt has initially, in the direction in which the nut is fitted, an insertion portion which is profile-free, the axial extent of this insertion portion being adapted to the axial extent of the second part.

Due to the non-circular opening contour of the second part, a bolt, at least at its free insertion end, may have a contour that is matched thereto. As a result of the contours of the mentioned bolt and the second part, which are optionally provided with matching play in one another, the second part does not co-rotate when the nut is twisted in the described manner. Use may be made of this feature in various ways. In the simplest way, it may be used as an indicator, for example, additionally having a colored or geometric design, for example, which indicates to the user that the twisting of the nut necessary to prevent the nut from coming off has been achieved. Even without a special design, the rotation of the first and second parts relative to one another may be recognized. The profile is preferably fixedly connected to the first part, or particularly preferably is formed in one piece with same.

A locking nut is thus provided Which may be easily mounted on a bolt. Twisting the nut provides security against the nut coming off, and at the same time, use may be made of the non-circular opening contour of the second part to ensure that the second part does not co-rotate, and benefits may thus be realized.

In regard to the combination, the nut may thus be easily slid onto the bolt part and then twisted so that the profiles of the nut and of the bolt part engage in one another, the second part not rotating along with the first part during this twisting, so that in the most general terms, as stated above, the second part is usable as an indicator that the nut is secured to the bolt part, namely, the profiles are engaged in one another, and it is not possible for the nut to come off the bolt without further twisting or reverse twisting.

With regard to the lack of rotatability of the bolt part in the opening in the second part, rotation by a few angular degrees, for example 0.1 to 20 angular degrees, may still be possible. It is important that the lack of rotatability results in a coupled motion of the second part due to the bolt when there is rotation of the bolt in the nut.

In first instance the nut is described below, followed by a description of the mentioned combination of a nut with a bolt part. The description of the nut, also above, is important in both cases, since all described embodiments of the nut may be implemented in the mentioned combination as well as with the nut alone. Similarly, the description of the bolt part is important, in any case for explanation of the nut independently of the mentioned combination. The designs of the nut which are important here, concerning in particular the profile and the association of the first and second parts and their configuration, may also be provided in a plate part which may be rotatable, or also may be provided to be stationary. In the latter case, as a rule only the bolt is rotated relative to the plate part.

That the second part is rotatable relative to the first part about the rotational axis in a limited angular range takes into account the fact that the profile is also provided on only a portion of the bolt part in the peripheral orientation. Thus, the angular limitation may be adapted in such a way that in the rotated state of the first part, the profiles are aligned with one another to the greatest extent possible.

In the untightened position, the shared opening contour, i.e., the overall opening contour of the first and second parts which results when the parts are in this aligned position, corresponds to a peripheral contour of the bolt or is larger, at least in places, than a peripheral contour of the bolt in its region provided with the profile. Alternatively, the opening contour may be smaller as the result of the opening contour of the second part. This is, for example, a design in which the bolt at its free end, on which the nut is placed, initially has a smaller contour over which the opening in the first part may be easily pushed, but which further fits into the opening contour of the second part, which is then smaller, but the second part cannot be pushed further over this smaller contour of the bolt.

In another embodiment, it is provided that in the twisted position, the parts are secured to one another in a positive-fit manner, particularly preferably by means of a detent lock. The twisted position cannot thereby be discontinued by simple twisting, optionally by force, of the parts relative to one another; instead, a part which secures the detent lock, for example a button, must be acted on, for example by lifting or pressing or also turning a part which secures the detent lock. It may also be provided that only a one-time detent lock may be achieved. The locked position then cannot be discontinued without special measures such as complicated disassembly.

It is further preferred that the parts are preloaded into their untwisted position, the untightened position. This ensures that a nut in each case may be freely slid over a bolt without having to make sure beforehand that the rotated position of the parts relative to one another is suitable to do so. When the twisted position is departed from during the course of loosening the nut from the bolt, the parts automatically assume the untwisted position, i.e., the untightened position, relative, to one another.

It is further preferred that the opening contour of the second part in a perpendicular projection extends radially inwardly, at least in places, with respect to the profile of the first part. The non-circular configuration is provided in particular in the region which overlaps with the profile of the first part, in regard to the untightened position. In alignment with an unprofiled peripheral portion of the first part, in the untightened position, the opening contour of the second part is preferably based on a circular shape. The circular shape may be formed based on the largest opening dimension of the opening contour of the second opening, with respect to a center axis which passes through the opening contour, or with respect to a rotational axis which passes through the bolt when the nut is mounted on a bolt. This largest opening dimension may accordingly be the diameter of the circular shape. Additionally or alternatively, it may be provided that the opening contour of the second part in its largest extent has a dimension which in the perpendicular projection exceeds a diametral dimension of the nut which reaches to the profile crest with respect to the profile of the first part, and in its smallest extent has a dimension that is smaller than the mentioned diametral dimension.

It is further preferred that the contour of the second part is composed in part of a portion that is based on a circular shape, and is composed in part of a portion that is not based on a circular shape, and is preferably composed of the long sides of a portion of a rectangle.

In the axial direction the first and the second part are situated one after the other, at least in places, and at least with respect to their engagement portions. The engagement portion of the second part is the contoured opening which actually extends over a certain height in the axial direction of the rotational axis. The engagement portion of the first part is the part of the opening that is provided with the profile. The profile extends over a certain height in the axial direction of the rotational axis. A plurality of profiles, for example three or more, up to a hundred or thousand profiles, for example also thread turns, are preferably provided one after the other in the axial direction of the rotational axis. This applies to the profiles of the nut as well as the profiles of the bolt. The first and the second parts may also be in alignment with one another. One part may be accommodated in the other. The second part is preferably accommodated in the first part. It is also preferred that the extent of the second part in the direction of the rotational axis is shorter than the extent of the first part. This also further applies to the extent of the inner face of the first part, which is provided with a profile. It is further preferred that the extent of the engagement portion of the second part is approximately ½₀ to ½ the extent of the profile portion of the first part in the axial direction of the rotational axis.

In the case that the parts are lockable relative to one another, a release part which is movable relative to the first and/or second part is preferably provided for releasing the locked position. The release part may be activated, for example, transversely with respect to the direction of extent of the rotational axis. Alternatively or additionally, the release part may be activated by rotation about the rotational axis.

The interaction of the nut with the bolt is also provided in particular in such a way that in the mounting direction of the nut, in first instance the bolt preferably has a portion, an insertion portion, that is free of profiles. However, a largest cross-sectional dimension is preferably greater than a largest cross-sectional dimension of the bolt in the region of a profile base in the portion of the bolt in which profiles are provided. It is further preferred that the axial extent of this profile-free portion or insertion portion is adapted at least to the axial extent of the opening in the second part. As the result of mounting the nut on the bolt, the nut may be rotated only into an engagement position when its profile portion is completely aligned with the profile of the bolt. Prior to this time, it is not possible for twisting to take place, on account of the collision which then occurs between the peripheral profile provided on the inner face of the nut and the profile-free area of the bolt, which, however, has a correspondingly larger diameter. When it is possible for the twisting to take place, however, the second part has then preferably already traveled over the mentioned profile-free area of the bolt, so that at the same time it is ensured that rotation of the parts relative to one another takes place. The latter is preferably achieved in that the end of the profile of the nut, viewed in the axial direction, directly adjoins the second opening in the second part.

The mentioned profile on the nut and/or the bolt may be provided in particular in the form of one or a plurality of thread turns.

In the case of threads, it is also particularly preferred that the thread is a left-hand thread. When the twisted position is taken up, it may thus be ensured that the twisting is always made possible without prior clamping of the item to be secured by means of the nut to the bolt, for example. This is because, as a result of the left-hand thread, when the rotational position is taken up, the nut moves to an extent, albeit slight, away from the item to be secured. This is advantageous in any case when the nut which is secured to the bolt has the function of a stop part. However, if the nut is to be used as a fixing part, for example, a tightening effect upon twisting, i.e., a right-handed thread, may be advisable. When a profile is provided, a progression of the profile formations, preferably provided multiple times one after the other in the direction of the rotational axis, may be provided, which causes no movement of the nut in the direction of the rotational axis when the nut is twisted.

Furthermore, it is also preferred that the profile of the first part, the threaded formations if applicable, is/are provided over only two-thirds or less of the inner face of the first part of the nut. It is further preferred that in particular only two profile portions are separated from one another in the peripheral direction, so that preferably only two profile-free areas are also formed. The areas with and without a profile are also preferably provided opposite from one another in a congruent manner. It is further preferred that the areas each correspond to a cylindrical surface. Due to the interruptions in the peripheral direction, the profile has a beginning region and an end region for each of a preferred plurality of individual profiles situated one after the other. The beginning regions and/or end regions are preferably rounded or flattened, more preferably the end regions of the corresponding profile on the bolt, or also only the end regions of the mentioned profile on the bolt, in particular when the profile is composed of thread turns or threaded portions. The rounding or flattening is preferably rounding or flattening at the crest, resulting in a guiding effect. The rounding may be achieved, for example, in that a profile crest or in particular a thread crest is provided by "immersing" the profile or the thread into the surrounding material in the direction of extent of the profile or the thread turn.

The nut may have conventional contouring on its outer face. The nut may also be circular with respect to the outer face, as seen in the plan view.

It is further preferred that the release part is preloaded into an extended position which indicates the locked position. Accordingly, the locked position may be released by pressing or moving the release part against spring force which results from pressing or moving the release part. An automatic detent lock between the first and the second part may thus be achieved when a predetermined rotation angle is reached. Moreover, moving out of or emerging from the release part relative to an outer face, in particular a peripheral face, provides a desired indication of reaching the secured locked position. Alternatively, it may be provided that a detent part must be actively moved, for example pushed in or pulled out, in order to achieve the detent lock.

It may also be provided that a plurality of locked positions is provided for various rotation angles of the first and the second part.

The bolt part preferably has a rectangular cross-section. Two oppositely situated flat sides preferably have a profile-free or thread-free formation, while two other oppositely situated sides of the substantially rectangular cross-section are rounded and have a thread or profile.

The opening contour of the second part of the nut is correspondingly adapted thereto, also to be substantially rectangular, having two boundary lines extending in a straight manner and two boundary lines extending in a rounded manner, in each case also preferably being situated opposite one another. Two long sides and two short sides are preferably provided. A boundary line extending in a straight manner on the long side is particularly preferably provided.

It is further preferred that in the untwisted position, the profile of the first part in an axial projection is situated radially outwardly, at least in places, with respect to a contour line, optionally with respect to the boundary line which extends in a straight manner, if applicable. Overall, it is preferred, in the case of the first part due to the profile, that both openings have a non-circular opening contour, these opening contours being different from one another.

It is further preferred that the deviations from a circular opening contour in the case of the second part, based on a largest opening size, are greater than for the first part. In this regard, the deviation is understood to be in terms of a value. The flat portions, which, based on an ideal circular opening contour, are situated radially outside the opening contour, are then correspondingly larger for the second part than for the first part.

With regard to the disclosure, the ranges and value ranges stated previously and below also include all values in between, in particular in $\frac{1}{10}$ increments of the particular dimension, or if applicable, also for the case of dimensionless values, on the one hand for delimiting the mentioned range limits from below and/or above, but alternatively or additionally, also with regard to the disclosure of one or more single values from a particular range.

The invention is explained in greater detail below with reference to the accompanying drawings, which, however, merely represent exemplary embodiments. The drawings show the following:

BRIEF DESCRIPTION OF THE DRAWINGS

FIG. 6 shows a further section through the nut mounted on the bolt, in the twisted position, sectioned through the threaded regions of the nut;

FIG. 7 shows an exploded illustration of the nut and associated bolt;

FIG. 8 shows an illustration according to FIG. 7, but viewed obliquely from below;

FIG. 9 shows a cross-section of the item according to FIG. 2, sectioned along the line IX-IX;

FIG. 10 shows an illustration according to FIG. 9, in the twisted position;

FIG. 11 shows an illustration according to FIG. 8, in another embodiment;

FIG. 12 shows a cross-section of the nut mounted on the bolt in the embodiment in FIG. 11, in the untightened position;

FIG. 13 shows a cross-section of the item according to FIG. 12, sectioned along the line XIII-XIII;

FIG. 14 shows an illustration according to FIG. 12, in the twisted position;

FIG. 15 shows a cross-section of the item according to FIG. 14, sectioned along the line XV-XV; and FIG. 16 shows an illustration of the bolt with an enlarged detail of profiles and threads on the bolt.

DETAILED DESCRIPTION OF THE ILLUSTRATED EMBODIMENTS

Figure 1:
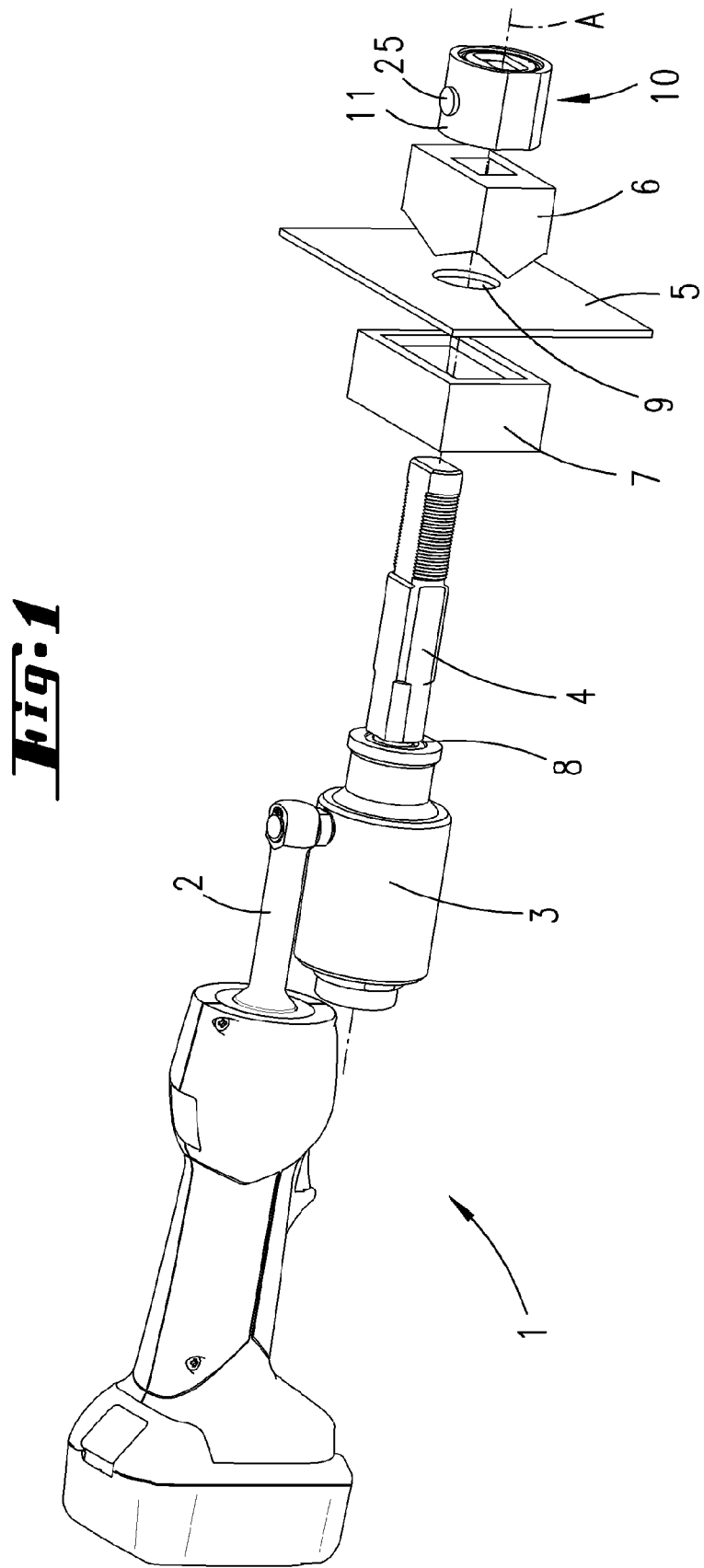
FIG. 1 shows a perspective illustration, partially in exploded view, of a hydraulic pressing device having a bolt part, a tool to be secured to the bolt part, and a lockable quick-change nut.

With reference initially to FIG. 1, an electrohydraulic handheld apparatus 1 is illustrated and described, which, to the extent not illustrated here in detail, is configured according to U.S. Pat. No. 7,421,877 B2, for example, except that in first instance, instead of the working piston which is movably accommodated in a cylinder, a free-standing hydraulic line 2 is connected to the pressure line which is connected to the pump piston, the hydraulic line opening into the cylinder 3, in which a piston which returns in the working stroke is situated, and by means of which a bolt 4 may be retracted.

By means of this tool, a hole may be punched in a sheet 5, for example, using a punching tool 6 and a counter-holder 7. The counter-holder 7 is appropriately guided over the bolt 4, and can come to rest on a shoulder 8 of the bolt. The bolt is then guided through the opening 9 which is already present in the sheet 5, and on the rear side of the sheet 5, the tool 6 is then pushed onto the bolt 4, and subsequently the nut 10 is pushed on, and in the pushed-on state is then locked by rotation about a bolt axis. A detent lock is thus achieved, as explained in greater detail below, and then a release part 25, for example, is moved outward.

Figure 2:
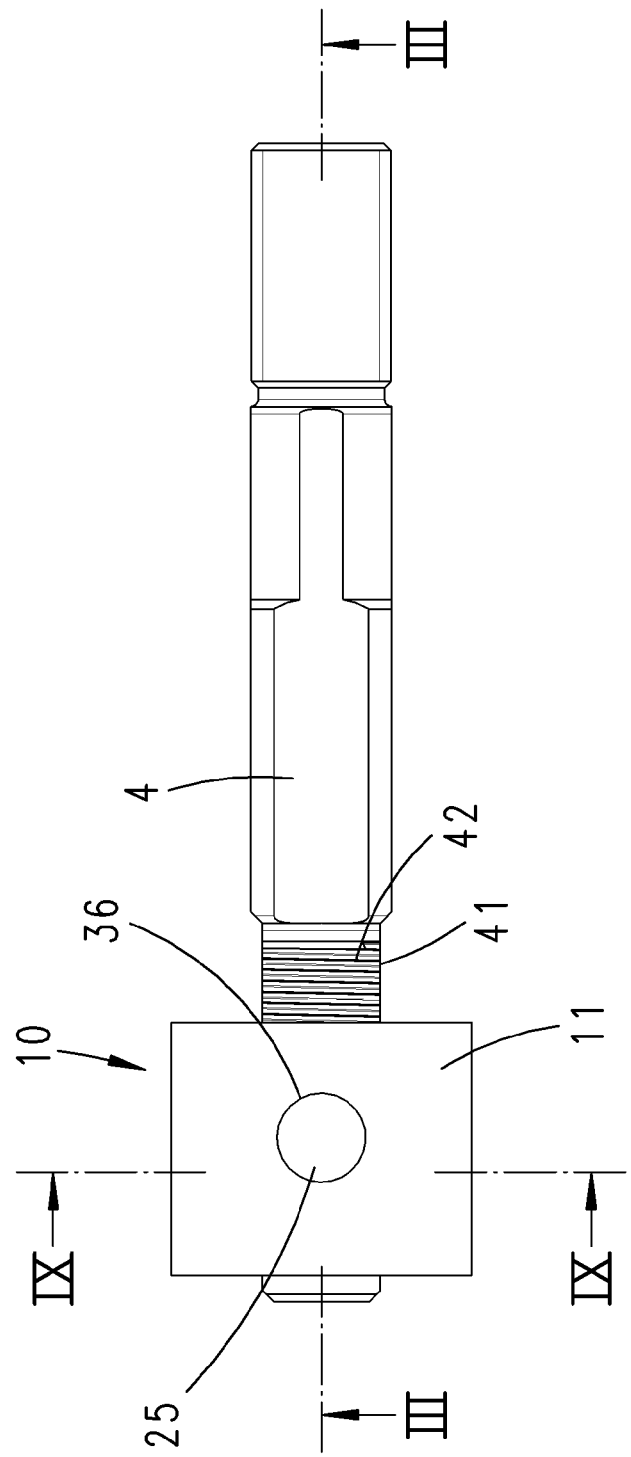
FIG. 2 shows a view of the bolt part with a mounted nut.

The locked state of the nut 10 on the bolt 4 is illustrated in FIG. 2. The nut 10 is in the twisted position relative to the bolt 4.

Figure 3:
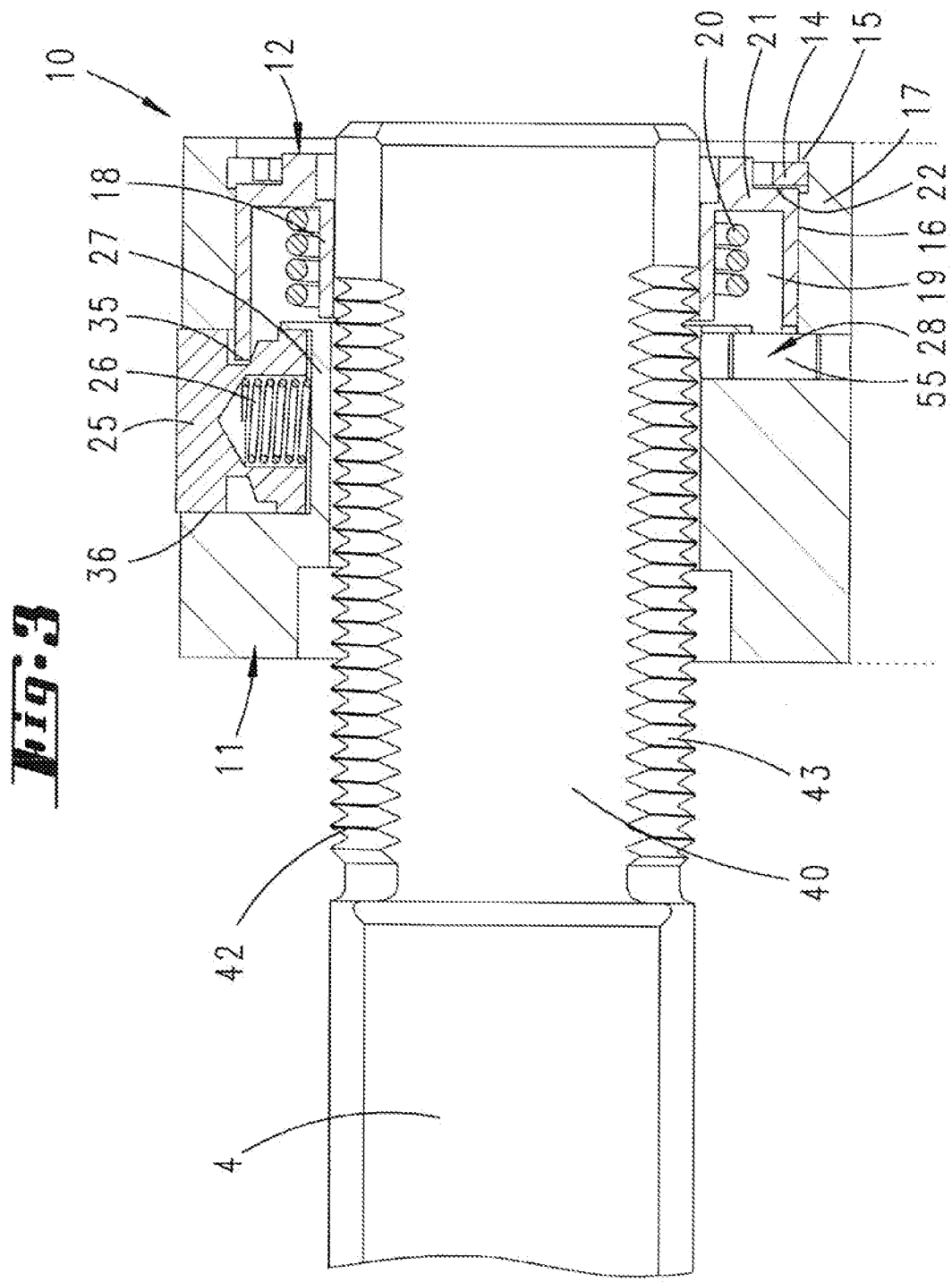
FIG. 3 shows a cross-section through the item according to FIG. 2, sectioned along the line III-III.
Figure 4:
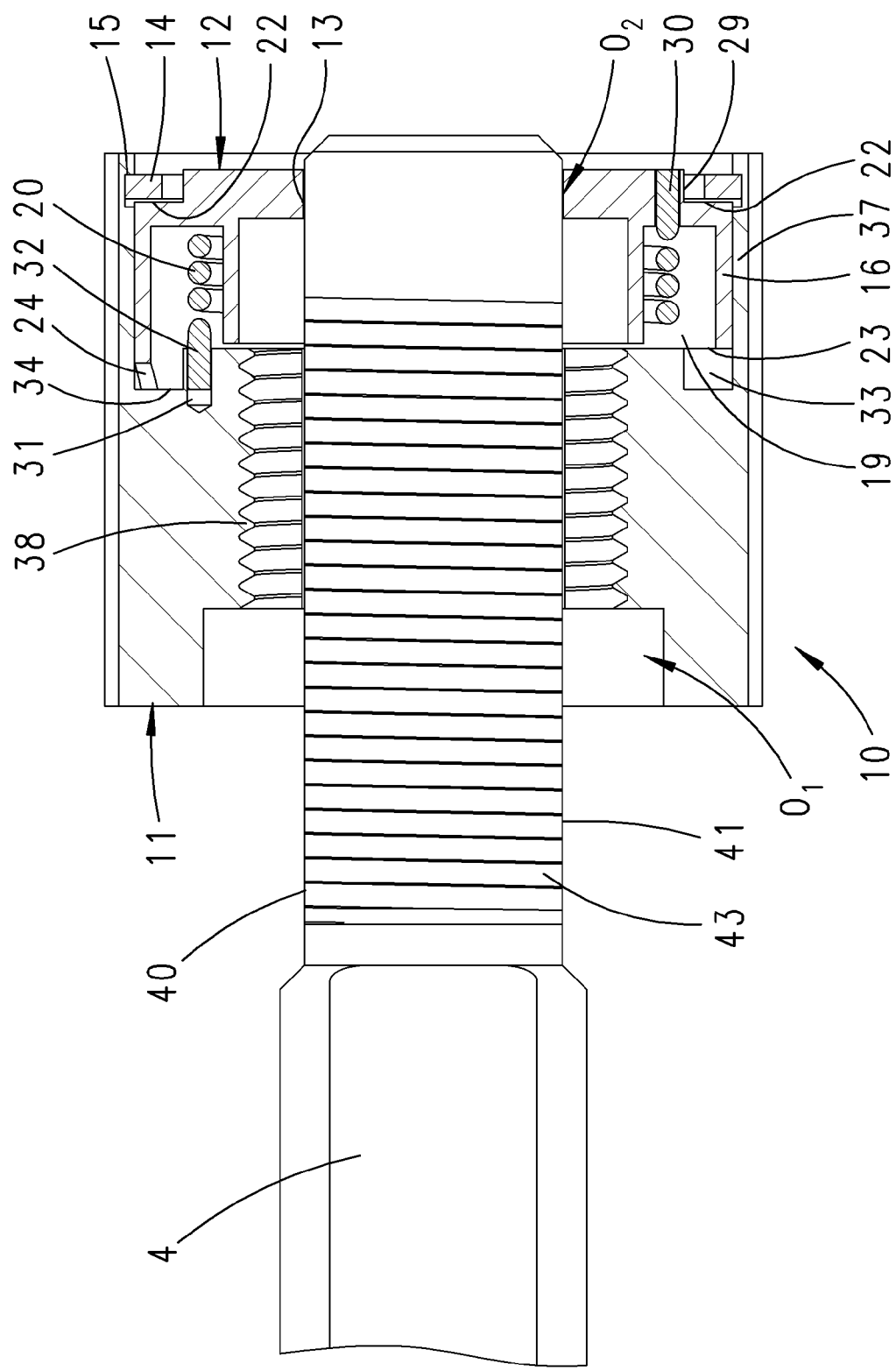
FIG. 4 shows an illustration according to FIG. 3, but with the first and second parts of the nut twisted relative to one another, and the nut being in the locked position.

The structure of the nut and the locking are explained in greater detail with reference to FIGS. 3 to 10. FIG. 3 also indicates by dashed lines that the embodiments with respect to the nut may also be provided in a plate part.

The nut 10 has in first instance a first part 11 having a through first opening $O_1$ (see FIG. 8, for example) and a second part 12 having a through opening $O_2$ (also see FIG. 7).

The opening $O_2$ has an opening contour which is delimited by the border edge 13. The opening contour of the second opening $O_2$ is non-circular. In particular, in the exemplary embodiment, the opening $O_2$ is firmed with a rectangular opening contour, the long sides being rectilinear but the narrow sides being concavely rounded.

A rotational axis A passes through both openings $O_1$, $O_2$. It is preferred, and in the exemplary embodiment achieved, that the rotational axis A is the shared rotational axis of the first part 11 and the second part 12. The rotational axis A is preferably the center axis of the first part 11 and/or of the second part 12.

The parts 11, 12 are rotatably connected to one another.

For the rotatable connection of the two parts 11, 12, the second part 12 is inserted into the first part 11. Furthermore, a positive-fit mounting of the second part 12 in the first part 11 is provided—in the exemplary embodiment, preferably by a snap ring 14 which engages into an undercut 15 in the first part 11. With the exception of the release part 25, if applicable, a peripheral face of the nut is formed solely by the nut 11.

The second part 12 has a first wall 16 which extends inside an outer wall 17 of the first part 11. The first wall 16 preferably provides rotational guiding of the second part 12 on the first part 11.

In addition, as in the exemplary embodiment, it may be provided that the second part 12 has a second wall 18 which extends radially inwardly displaced with respect to the first wall 16. The first wall 16 and/or the second wall 18 preferably extend(s) in the direction of the axis A, particularly preferably parallel thereto. An interspace 19 is left open between the first wall 16 and the second wall 18 at the bottom, i.e., facing the profile region of the first part 11. The first wall 16 and the second wall 18 are preferably concentric with respect to one another, and particularly preferably each have a circular shape in plan view. The walls 16 and 18 are connected via a U-shaped web 21. The web 21 has a stepped shape on the top side. The step preferably opens radially outwardly, and preferably rests on a lower step face 22 of the snap ring 14. As is apparent from FIG. 8, for example, the first wall 16 of the second part 12 is preferably profiled on the bottom side. The first wall 16 has a circumferential cutout 23, for example, and also preferably a positioning recess 24.

The circumferential recess 23 may be used to limit the angular rotatability of the second part 12 relative to the first part 11. The positioning recess 24 preferably allows the release part 25 in the twisted position, i.e., locked position, to move from a retracted position according to FIG. 3 into the extended position according to FIG. 5. For this purpose, the release part 25 is outwardly preloaded by a compression spring 26 against a radially inwardly aligned wall 27 of the first part 11.

The extension of the release part 25 in the twisted position, by means of which the detent lock is formed, as provided in the exemplary embodiment, also has the advantage of an indicator, in particular an indicator which is detectable by touch.

Figure 5:
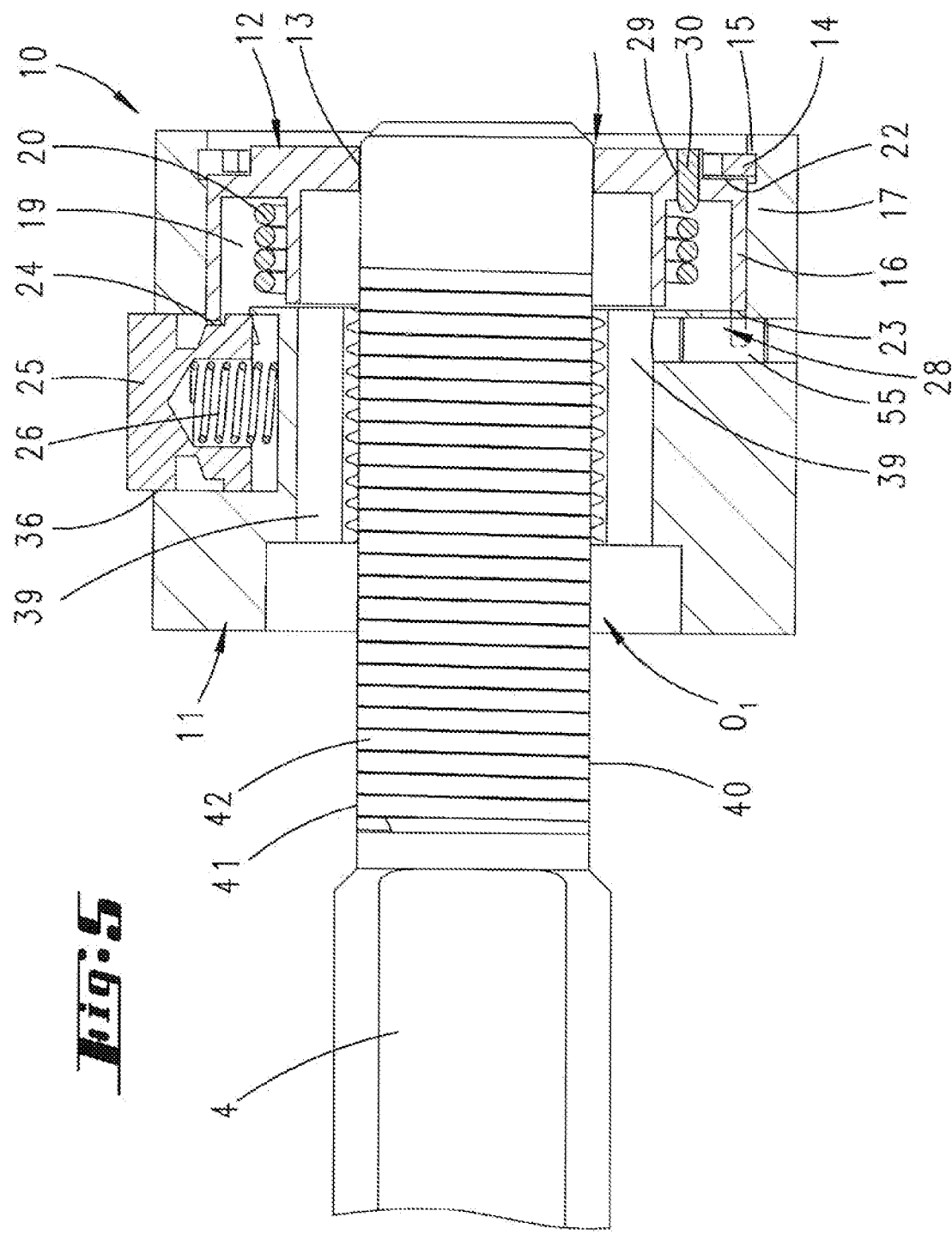
FIG. 5 shows an illustration according to FIG. 4, but sectioned in the region of the release part.

To move from the twisted position according to FIG. 5, in which the nut is non-detachably secured to the bolt, back into the untightened position according to FIG. 3, in the exemplary embodiment in FIGS. 1 to 10 the user must directly press the release part 25 radially inwardly against the spring 26. Due to the preloading of the parts 11 and 12 with respect to one another into the untightened position according to FIG. 3 on account of loading of the spring 20 in the locked position according to FIG. 5, when the release part 25 is pressed down in the position in FIG. 5, the first part 11 rotates practically automatically relative to the second part 12 back into the position according to FIG. 3.

The limited rotatability of the first part 11 relative to the second part 12 due to the circumferential recess 23 is particularly preferably ensured by a stop part 28 which is connected to the first part 11 in a rotationally fixed manner or formed on the first part 11 in some other way.

The spring 20 is secured to both the first part 11 and the second part 12. The spring 20 is preferably secured, on the one hand, in the second part 12 by one end 30 which engages into a hole 29 in the second part 12, and on the other hand is secured in the first part 11 by a second end 32 which engages into a hole 31 in the first part 11. As is further apparent in particular from FIG. 6, the first part 11 facing the second part 12 forms a ring-shaped circumferential recess 33 at the top. Except for the region of the circumferential opening 23 and the positioning recess 24, the lower face 35 of the wall 16 of the second part 12 is supported on the planar base 34 of the recess 33.

The stop 28, which in the exemplary embodiment is formed by a peg 55, protrudes into the recess 33.

In the region of the release part 25, the recess 33 merges into a rounded recess 36, which also passes through the wall region 37 of the first part 11 which adjoins above the base 34 of the recess 33. The rounded recess 36 is formed with a radially extending center axis.

The first part 11 has a profile, preferably threaded formations 38, on the inside. These are two oppositely situated threaded formations 38 which are interrupted by a thread-free face 39, two of which are also correspondingly provided opposite one another. The face 39 extends on a diameter which corresponds to the root of the thread 38. The threaded formations 38 or other profiles, as previously stated, are preferably formed starting from a cylindrical base area. The radially inward delimitation of the threaded formations on the crest side is particularly preferably also formed by a cylindrical surface, optionally with the exception of a flattening or rounding at the end of the formation, as explained in greater detail below.

As is particularly apparent from FIGS. 9 and 10, the bolt 4 has a substantially rectangular cross-section with two oppositely situated profile-free sides 40, 41 and two profiled sides 42, 43, which in the exemplary embodiment have threaded formations. While the sides 40, 41 have a cross-section extending in a straight line, the sides 42, 43 provided with a thread have a contour which follows a circular line.

The profiles of the bolt and of the nut, in particular the threaded formations, have a complementary design. The dimensions are selected so that a direct engagement in the sense of a thread and a mating thread is made possible.

A further embodiment is described with reference to FIG. 11.

This further embodiment differs from the previously described embodiment in particular by virtue of a rotating sleeve 44 additionally situated on the first part. This rotating sleeve 44 allows securing in the twisted position of the nut by rotating the rotating sleeve into a locked position. In the locked position, in this regard consistent with the previously described embodiment, the release part 25, which is now situated inside the rotating sleeve 44, may be moved outwardly, here as well under the action of the spring 26, and may thus secure the twisted position in the same way as in the above-described embodiment.

The rotating sleeve 44 has the advantage that the nut may be freely gripped over its entire circumference for changing from the untightened position into the twisted position.

The rotating sleeve 44 has a recess 45 on the inside, which, in the exemplary embodiment, is formed in the sense of a thinned wall of the rotating sleeve 44. In its cross-section, i.e., extending in the peripheral direction as is apparent from FIG. 13, for example, the recess 45 has rounded or chamfered end regions 46, 47, which during twisting allow the release part 25 to be pressed downwardly from the position according to FIG. 15 into the position according to FIG. 13.

The rotating sleeve 44 is rotatably but captively secured to the first part 11—in the exemplary embodiment, by means of a snap ring 48.

In addition, the rotating sleeve is preferably rotatable relative to the first part 11 only in a limited angular range. The angular limitation may be achieved by a bolt 49, for example, which partially protrudes into the recess 45, where it interacts with the chamfer 46 or 47 in each case.

In other respects, the same conditions are present as in the first described embodiment.

FIG. 16 (also see the enlarged illustration) illustrates a flattening on a thread turn, or of a profile in principle, in the present case on the bolt 4, but as illustrated in dashed lines in the enlarged illustration, also on the nut. The flattening makes it easier to fit the profiles into one another during twisting into the locked position. As is apparent, an end face of a thread turn 50 of the bolt is not formed corresponding to a radial, having a perpendicular face which is then based on a peripheral direction, but instead is formed with an end face 52 which runs into the surrounding material 51 in a flattened manner. In the exemplary embodiment, the thread also has a leading edge or end face 53. This leading edge 53 is formed in an end portion 54 in an obliquely sloping manner.

The nut preferably does not have a special configuration, or only a correspondingly flat end face 52' is provided. Here as well, however, a sloping portion 54' of a leading edge 53' in this regard may optionally be provided.

It is important that the dimensions are always such that a distinct overlap a (with an obliquely sloping end portion 54' for the nut) or b (without an obliquely sloping portion 54' for the nut) results between the leading edges of the thread.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

The invention claimed is:

1. A nut comprising:
a first part having a first through opening,
a second part having a second opening, said second opening having an opening contour,
the second part seats within the opening of the first part and the first and second parts being connected to one another so as to be rotatable relative to one another about a rotational axis which passes through the openings and the openings being aligned with one another,
the first opening having a profile on an inner face which extends in a peripheral direction and is interrupted in the peripheral direction,
the opening contour of the second part being non-circular,
the second part is rotatable relative to the first part about the axis of rotation in a limited angular range,
a biasing member engaging the first and second parts to preload the first and second parts into an untwisted position;
wherein one of the parts secures the parts together into a twisted position in a positive-fit manner, and action takes place on said part that secures the parts together into the twisted position in order to enable the parts to move to the untwisted position.

2. The nut according to claim 1, wherein an extent of the second part in the direction of the rotational axis is shorter than an extent of the first part.

3. The nut according to claim 1, wherein the twisted position is detent-locked.

4. The nut according to claim 1, wherein the part that secures the parts together into the twisted position includes a spring loaded pin which engages with the other part.

5. The nut according to claim 1, wherein the biasing member is a spring.

6. A nut comprising:
a first part having a first through opening,
a second part having a second opening, said second opening having an opening contour,
the second part seats within the opening of the first part and the first and second parts being connected to one another so as to be rotatable relative to one another about a rotational axis which passes through the openings and the openings being aligned with one another,
the first opening having a profile on an inner face which extends in a peripheral direction and is interrupted in the peripheral direction,
the opening contour of the second part being non-circular,
the second part is rotatable relative to the first part about the axis of rotation in a limited angular range,
wherein one of the parts secures the parts together into a twisted position in a positive-fit manner, and action takes place on said part that secures the parts together into the twisted position in order to enable the parts to move to an untwisted position, wherein the twisted position is detent-locked, and
a release part movable relative to the first and/or second part and capable of releasing the twisted position.

7. The nut according to claim 6, wherein the release part is activated transversely with respect to the direction of extent of the rotational axis, or by rotation about the rotational axis.

8. A nut comprising:

a first part having a first through opening, a second part having a second opening, said second opening having an opening contour, the second part seats within the opening of the first part and the first and second parts being connected to one another so as to be rotatable relative to one another about a rotational axis which passes through the openings and the openings being aligned with one another, the first opening having a profile on an inner face which extends in a peripheral direction and is interrupted in the peripheral direction, the profile is one or a plurality of thread turns, the opening contour of the second part being non-circular, the second part is rotatable relative to the first part about the axis of rotation in a limited angular range, wherein one of the parts secures the parts together into a twisted position in a positive-fit manner, and action takes place on said part that secures the parts together into the twisted position in order to enable the parts to move to an untwisted position.

9. The nut according to claim 8, wherein the one or plurality of thread turns are in the form of a left-hand thread.

10. A combination comprising:

a bolt having a length and a cross-sectional area; and a nut having a first part having a first opening, said first opening having an inner profile, the nut having a second part having a second opening, said second opening having an opening contour, the second part seats within the opening of the first part and the parts being connected to one another so as to be rotatable relative to one another about a rotational axis of the nut, and the openings being in alignment, and the cross-sectional area of the bolt having, at least in places, a contour over the length of the bolt which matches the opening contour of the second opening such that the bolt is insertable into the second opening but is not rotatable therein, wherein the bolt has initially in the direction in which the nut is fitted, an insertion portion which is profile-free, the insertion portion having an axial extent which corresponds to an axial extent of the second part.

11. A nut comprising:

a first part having a first through opening, a second part having a second through opening having an opening contour, the second part seats within the opening of the first part and the first and second parts being connected to one another so as to be rotatable relative to one another about a rotational axis which passes through the openings and the openings being aligned with one another, the first opening having a profile on an inner face which extends in a peripheral direction and is interrupted in the peripheral direction, the opening contour of the second part being non-circular, the second part is rotatable relative to the first part about the axis of rotation in a limited angular range, wherein one of the parts secures the parts together into a twisted position in a positive-fit manner, and action takes place on said part that secures the parts together into the twisted position in order to enable the parts to move to an untwisted position.

12. A nut comprising:

a first part having a first through opening, a second part having a second opening, said second opening having an opening contour, the second part seats within the opening of the first part and the first and second parts being connected to one another so as to be rotatable relative to one another about a rotational axis which passes through the openings and the openings being aligned with one another, the first opening having a profile on an inner face which extends in a peripheral direction and is interrupted in the peripheral direction, the profile is one or a plurality of thread turns and one or a plurality of unthreaded portions, the opening contour of the second part being non-circular, the second part is rotatable relative to the first part about the axis of rotation in a limited angular range, wherein one of the parts secures the parts together into a twisted position in a positive-fit manner, and action takes place on said part that secures the parts together into the twisted position in order to enable the parts to move to an untwisted position.

13. A combination comprising:

a nut having a first part having a first through opening, a second part having a second through opening, said second opening having an opening contour, the second part seats within the opening of the first part and the first and second parts being connected to one another so as to be rotatable relative to one another about a rotational axis which passes through the openings and the openings being aligned with one another, the first opening having a profile on an inner face which extends in a peripheral direction and is interrupted in the peripheral direction, the opening contour of the second part being non-circular, the second part is rotatable relative to the first part about the axis of rotation in a limited angular range, a biasing member engaging the first and second parts to preload the first and second parts into an untwisted position, wherein one of the parts secures the parts together into a twisted position in a positive-fit manner, and action takes place on said part that secures the parts together into the twisted position in order to enable the parts to move to the untwisted position; and a bolt inserted through said first and second through openings.

14. The combination according to claim 13, wherein the part that secures the parts together into the twisted position includes a spring loaded pin which engages with the other part.

15. The combination according to claim 13, further comprising a rotatable sleeve which is engageable with the spring loaded pin to hold the pin into a depressed condition.

16. The combination according to claim 13, wherein the biasing member is a spring.

17. A combination comprising:

a nut having a first part having a first through opening, a second part having a second through opening, said second opening having an opening contour, the second part seats within the opening of the first part and the first and second parts being connected to one another so as to be rotatable relative to one another about a rotational axis which passes through the openings and the openings being aligned with one another, the first opening having a profile on an inner face which extends in a peripheral direction and is interrupted in the peripheral direction, the opening contour of the second part being non-circular, the second part is rotatable relative to the first part about the axis of rotation in a limited angular range, wherein one of the parts secures the parts together into a twisted position in a positive-fit manner, and action takes place on said part that secures the parts together into the twisted position in order to enable the parts to move to an untwisted position; and a bolt inserted through said first and second through openings, wherein the bolt has a length and a cross-sectional area, the cross-sectional area of the bolt having, at least in places, a contour over the length of the bolt which matches the opening contour of the second opening such that the bolt is insertable into the second opening but is not rotatable therein, wherein the bolt has initially in the direction in which the nut is fitted, an insertion portion which is profile-free, the insertion portion having an axial extent which corresponds to an axial extent of the second part.

* * * * *